Sept. 9, 1969    E. WOLF ET AL    3,466,550
FREQUENCY-TO-VOLTAGE CONVERTER
Filed Dec. 6, 1965    2 Sheets-Sheet 2

FIG. 2

United States Patent Office 3,466,550
Patented Sept. 9, 1969

---

3,466,550
FREQUENCY-TO-VOLTAGE CONVERTER
Edgar Wolf, New Hyde Park, David E. Worster, West Islip, and Francis C. Marino, Huntington, N.Y., assignors to Digitronics Corporation, Albertson, N.Y., a corporation of Delaware
Filed Dec. 6, 1965, Ser. No. 512,037
Int. Cl. H03k 5/20
U.S. Cl. 328—140
17 Claims

ABSTRACT OF THE DISCLOSURE

Apparatus for converting an input signal shifting between first and second frequencies to a signal switching between first and second levels of voltage comprising means for generating a pulse for each cycle of input signal. A representation of the number of pulses occurring during a specific time interval is accumulated by means and means is provided for generating a first voltage level as long as the accumulated pulses are less than a given number and for generating a second voltage level when the accumulated pulses are greater than said given number.

---

Figure 1:
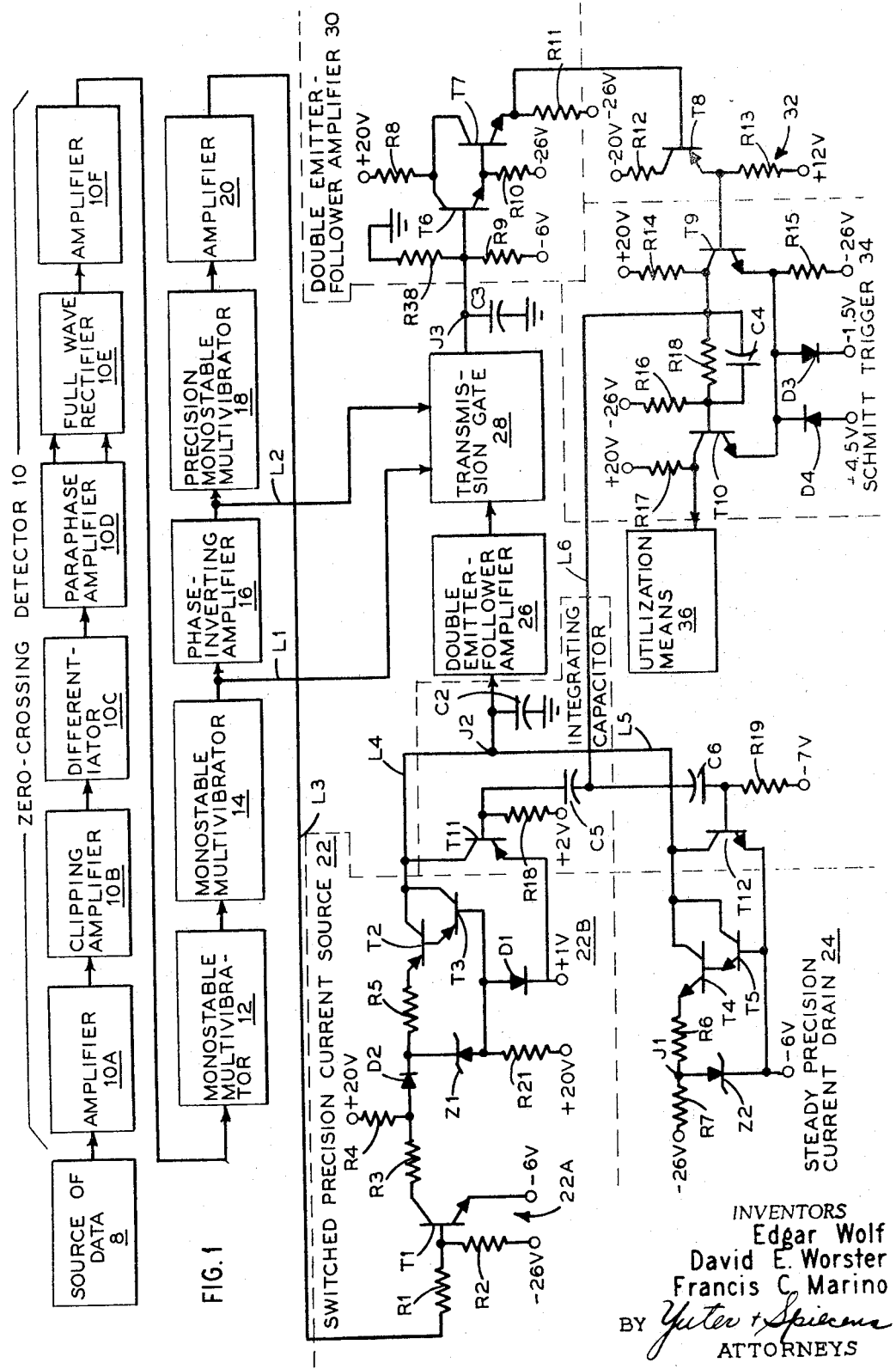

This invention pertains to frequency detectors and more particularly to apparatus for converting signals shifting between two frequencies to signals switching between two voltage levels.

In the field of data processing, the data are generally represented by coded combinations of bits. Most often, in a data processor, the bits of data are represented by two voltage levels. However, during the transmission of data between remote stations it has been found to be more reliable to utilize signals shifting between two frequencies to represent the bits. Since the processor, per se, utilizes the two voltage level representation, it is necessary to convert the two frequency representation to the two level representation at the interface of the communication link and the processor.

Accordingly, there is available apparatus to perform the conversion. However, such apparatus generally is a compromise between the requirement of fast response time to sense the changes in frequency and slow response times to ignore unwanted transient voltages. Because of such a compromise the reliability of the converter is less than desired.

It is, therefore, a general object of the invention to provide improved apparatus for converting a signal shifting between two frequencies to a voltage switching between two levels.

It is another object of the invention to provide such apparatus which is immune to transients and noise in the input signal.

It is a further object of the invention to provide such apparatus which is on the one hand more reliable than previously available apparatus and which is on the other hand relatively simple and inexpensive.

Generally, the invention converts a signal shifting between first and second frequencies representing bits to a voltage switching between first and second levels in accordance with the state of the signal during an increment of time essentially equal to a bit period. In particular, means are provided for generating at least one pulse signal for each cycle of oscillation of the input signal. A representation of the number of such pulses occurring in a given time interval is accumulated. And a voltage having a first level is generated as long as the representation of the number of pulses accumulated in the given time interval is less than a given number of pulses and a voltage having a second level is generated whenever the representation of the number of accumulated pulses is greater than the given number.

In accordance with a feature of the invention there is included means for insuring that a series of bits of the same type does not prebias the accumulation of representations of the pulses by establishing extreme limits of accumulation so that the generated voltage level reliably represents the actual bits of information.

Another feature of the invention is concerned with signal reinforcement. It is contemplated to force the device which accumulated the pulses to a corresponding extreme limit of accumulation once the decision element which generates the voltages having the first and second levels has indicated a decision. Such a scheme minimizes distortion conditions.

A further feature of the invention contemplates the inclusion of "hysteresis" in the switching between voltage levels so that a change in voltage level occurs only after it is absolutely certain that the input signal frequency has shifted.

Other objects, features and advantages of the invention will be apparent from the following detailed description when read with the accompanying drawing which shows, by way of example and not limitation, two embodiments of the invention.

In the drawings:

FIGURE 1 shows a schematic diagram, partially in blocks, of apparatus utilizing analog techniques for converting a signal shifting between two frequencies to a voltage switching between two levels; and FIGURE 2 shows a logical block diagram of a digital system for converting a signal shifting between two frequencies to a voltage switching between two levels.

Referring now to FIGURE 1, there is shown an analog system for converting data bits represented by signals shifting between first and second frequencies to a voltage switching between first and second levels. For the sake of clarity the following representative parameters will be employed. However, it should be realized that the invention also contemplates other parameters. The basic bit rate is 600 bits per second. A mark bit is represented by a signal having a frequency of 1200 cycles per second; and a space bit by a signal having a frequency of 2200 cycles per second. Thus, in each bit period there are four half cycles of the 1200 cycle waveform and 7+ half cycles of the 2200 cycle waveform. Stated in another way, there are four zero-crossings of the 1200 cycle waveform and seven zero-crossings of the 2200 cycle waveform in each bit period.

It has been found that the most reliable detection of the data comes from detecting the zero crossings. Therefore, the data bits in the form of substantially sinusoidal signals shifting between the two frequencies are fed from a source of data 8 to zero-crossing detector 10. The sinusoidal wave form is amplified by amplifier 10A and fed to clipping amplifier 10B to form a substantially square waveform. The square waveform is differentiated by differentiator 10C and fed via paraphase amplifier 10D to full wave rectifier 10E. The output of rectifier 10E is amplified by amplifier 10F whose output is, therefore, a series of unidirectional pulses wherein each pulse represents a zero-crossing. There is one pulse for each half cycle of the signal from source of data 8. Since each of the elements of zero-crossing detector 10 is well known, it will not be further described.

The pulses are fed to monostable multivibrator 12 which delivers a 50 microsecond pulse for each pulse received from zero-crossing detector 10. The leading edge of each pulse from monostable multivibrator 12 triggers monostable multivibrator 14 to deliver a 25 microsecond pulse. Since such multivibrators are well known in the art, they will not be described. The pulses from monostable multivibrator 14 are fed to the line L1 and to phase-inverting amplifier 16. The inverted pulses are fed to line L2 and to precision monostable multivibrator 18. Multivibrators 12 and 14 cooperate to provide "edge cleanup," i.e., insure that a single pulse is generated for each zero-crossing even if there is some ripple on the original waveform. Multivibrator 14 and phase-inverting amplifier 16 cooperate to generate a pair of out-of-phase transfer pulses to operate transmission gate 28 for each zero-crossing, as is hereinafter described.

Precision monostable multivibrator 18 transmits a pulse having a duration of 136 microseconds for each pulse received and starting at the trailing edge of the received pulse. Although the mutivibrator 18 is of conventional design, its components should be chosen so that precise time interval pulses are generated which are insensitive to temperature. In particular, one-percent tolerance resistors having low temperature drift should be employed. In addition, it may be desirable to utilize other well known temperature and voltage stabilization techniques. The precise time duration pulses, having a negative polarity, generated by multivibrator 18, are fed via amplifier 20 and line L3 to switched precision current source 22. Switched precision current source 22 comprises common emitter amplifier 22A and a constant current amplifier 22B. Whenever a negative going pulse is received by common emitter amplifier 22A, current having a constant amplitude is transmitted by constant current amplifier 22B for the duration of the negative going pulse.

Common emitter amplifier 22A includes the N-P-N transistor T1 having an emitter connected to source of negative potential −6 v., a base connected via resistor R1 to line L3 and via resistor R2 to source of negative potential −26 v., and a collector coupled via serially connected resistors R3 and R4 to source of positive potential +20 v.

Constant current amplifier 22B comprises the P-N-P transistors T2 and T3 having collectors connected to line L4. The base of transistor T2 is connected to the emitter of transistor T3. The base of transistor T3 is clamped to a slightly positive potential (about one volt) by virtue of its connection to the junction of resistor R21 (connected to source of positive potential +20 v.) and the anode of diode D1 whose cathode is connected to source of positive potential +1 v. The emitter of transistor T2 is connected to resistor R5 whose other end is connected to the cathode of diode D2. The anode of diode D2 is connected to the junction of resistors R3 and R4. A Zener diode Z1 has its cathode connected to the junction of resistor R5 and diode D2, and its anode connected to the junction of diode D1 and resistor R21. Transistors T2 and T3 are so connected to appear as a single transistor having a very high $\beta$. Zener diode Z1 establishes a fixed voltage drop between the base of transistor T3 and the junction of diode D2 and resistor R5. Therefore, the voltage across resistor R5 is constant as long as the collectors of transistors T2 and T3 are less positive than the voltage at the base of transistor T3.

During operation, in the absence of a negative pulse on line L3, transistor T1 conducts, dropping the voltage of its collector to substantially the voltage of its emitter. Diode D2 is back biased and nonconductive. In the presence of a negative pulse on line L3, transistor T1 is cut off and its collector voltage is high. Diode D2 conducts and current flows from source +20 v. via diode D2, resistor R5, transistors T2 and T3 and line L4 to integrating capacitor C2. At this time, by virtue of the fixed potential at the base of transistor T3, as previously described, the current flow is constant. Since the duration of the negative going pulse is fixed, a fixed quantum of charge is delivered to integrating capacitor C2. Accordingly, the voltage across capacitor C2 and at junction J2 rises. Whenever this voltage tends to exceed the voltage at the base of transistor T3, current flows from the collector to the base of transistor T3. Establishing the voltage of the base of transistor T3 at a value equivalent to the voltage at junction J2 when the correct number of cycles of high frequency signal in a bit period is received insures that the voltage at junction J2 never exceeds upper limit so that the final output is only influenced by the first preceding bit.

Steady precision current drain 24 comprises N-P-N transistors T4 and T5 whose collectors are connected via line L5 to junction J2. The base of transistor T5 is connected to source of negative potential −6 v. The emitter of transistor T5 is connected to the base of transistor T4. The emitter of transistor T4 is connected via resistor R6 to junction J1 which is connected via resistor R7 to source of negative potential −26 v. Zener diode Z2 has an anode connected to junction J1 and a cathode connected to the base of transistor T5, thus fixing the voltage between the base of transistor T5 and junction J1. Consequently, a fixed voltage is established across resistor R6 as long as the voltage on the collectors is higher than the voltage of the base of transistor T5. Therefore, a constant current flows from integrating capacitor C2 via line L5, transistors T4 and T5, resistor R6 and resistor R7 to source of negative potnetial −26 v., except as described below.

It should be noted that whenever the voltage at junction J2 tends to drop below the base voltage of transistor T5 current flows from the base to the collector of this transistor. Hence, the minimum excursion of the voltage at junction J2 is clamped to the voltage at the base of transistor T5. By choosing the voltage of the base to be substantially equal to the voltage at junction J2 when the correct number of cycles of low frequency signal is received in a bit period insures that the voltage at junction J2 never recedes below a lower limit so that the final output is only influenced by the first preceding bit.

Integrating capacitor C2 is connected between junction J2 and ground and is used to accumulate representations, as quanta of charge, of the pulses resulting from the zero crossings. The voltage across capacitor C2 is sawtoothed and rises during the time source 22 delivers a quantum of charge in response to a pulse from amplifier 20, and decays during the interval between these pulses. Since the drain of charge is constant it should be apparent that the peak amplitude of the sawtooth waveform is a function of the rate of delivery of pulses by amplifier 20 or the frequency of zero-crossings. Therefore, during a space bit period the level of the voltage at junction J2 rises and during a mark bit it falls.

Double emitter-follower amplifier 26 has a high impedance input connected to junction J2 and an output connected to transmission gate 28.

Transmission gate 28 has an information input connected to the output of double emitter-follower amplifier 26, control inputs connected to lines L1 and L2 and an output connected to capacitor C3. Whenever the gate is opened, by virtue of signals on lines L1 and L2, the voltage of junction J2 is transferred to capacitor C3. At all other times the connection is open circuited. A suitable transmission gate is shown in FIGS. 14–21 and described in section 14–12 of "Pulse and Digital Circuits," by Millman and Taub, McGraw-Hill Book Company, Inc., 1956.

Since the transmission gate 28 is operative only during a 25 microsecond interval just before the delivery of each quantum of charge to integrating capacitor C2 and since, as will hereinafter become apparent, high resistances are connected to junction J3, a voltage having a "staircase" waveform is developed across capacitor C3. Therefore, no high frequency filtering is required.

Capacitor C3 is connected to double emitter-follower amplifier 30 having a high input impedance comprising N-P-N transistors T6 and T7 having their collectors connected via resistor R8 to source of positive potential +20 v. The base of transistor T6 is connected to the junction J3 which is connected to resistors R8 and R9 connected to ground and the source of negative potential −6 v., respectively. The emitter of transistor T6 is connected via resistor R10 to source of negative potential −26 v.; and the emitter of transistor T7 is connected via resistor R11 to source of negative potential −26 v. The emitter of transistor T6 is connected to the base of transistor T7. The emitter of transistor T7 is connected to emitter-follower amplifier 32. It should be noted that double emitter-follower amplifier 26 is similarly constructed.

Emitter-follower amplifier 32 which is provided only if the output impedance of double emitter-follower amplifier 30 is too high comprises P-N-P transistor T8 having a base connected to the emitter of transistor T7, a collector connected via resistor R12 to source of negative potential −20 v. and an emitter connected via resistor R13 to source of positive potential +12 v. Emitter-follower amplifier 32 is connected to Schmitt trigger 34.

Schmitt trigger 34 is a switchable means which generates a voltage switching between first and second levels. In particular, when the voltage at the input of Schmitt trigger 34 is high, the voltage at its output is high, and when the voltage at its input is low, the output voltage is low.

Schmitt trigger 34 comprises N-P-N transistors T9 and T10. Transistor T9 has a base connected to the emitter of transistor T8, a collector connected via resistor R14 to source of positive potential +20 v. and an emitter connected via resistor R15 to source of negative potential −26 v. Transistor T10 has a base connected via resistor R16 to source of negative potential −26 v., an emitter connected to the emiter of transistor T9 and a collector connected to utilization means 36 and via resistor R17 to source of positive potential +20 v. The parallel combination of resistor R18 and capacitor C4 couples the collector of transistor T9 to the base of transistor T10. An upper voltage clamping diode D3 has its anode connected to the emitters of transistors T9 and T10 and its cathode connected to source of negative potential −1.5 v. Lower voltage clamping diode D4 has its cathode connected to the emitters of transistors T9 and T10 and its anode connected to source of negative potential −4.5 v. The clamping diodes cause the circuit to have considerable hysteresis.

In particular, assume transistor T9 is conducting. In this case, its collector voltage is low, causing transistor T10 to be cut off. The emitter of transistor T9 is at about a −4.5 voltage potential by virtue of the clamping action of diode D4. When the voltage applied to the base of transistor T9 drops melow −4.5 volts, transistor T9 cuts off. Its collector voltage rises causing a rising voltage to be fed to the base of transistor T10 which starts conducting. By virtue of the regeneration resulting from the connection of both emitters to resistor R15 and the connection of the base of transistor T10 to the collector of transistor T9, there is almost an instantaneous switching on of transistor T10. The collector thereof starts transmitting a low level voltage to utilization means 36. The emitter of transistor T9 is clamped by diode D3 to a voltage of −1.5 volts. This condition persists until the voltage fed to the base of transistor T9 rises to at least −1.5 volts. At that time, transistor T9 again start conducting. The regenerative action takes over resulting in transistor T9 being in full conduction and transistor T10 cut off. Transistor T10 now transmits a high level voltage to utilization means 36 and the emitter of transistor T9 is clamped to a −4.5 volt level. Thus, it is seen that there is required a three volt difference in the voltage swing at the base of transistor T9 to cause the switching of the Schmitt trigger 34. Since the signals fed to the base of transistor T9 are derived from the voltage across the integrating capacitor C2, and since this voltage is dependent on the rate of occurrence of zero-crossing of the input signal, it follows that there is a spread in the number of zero-crossings for switching the level of the output voltage. For the example given, when there are six zero-crossings in a bit period the output voltage level switches to high, representing a space bit, and remains there until only four zero-crossings are monitored in a bit period time interval. At that time, the output voltage switches to a low level, representing a mark bit, and remains there until there are six zero-crossings in a bit period time interval. Hence, the ambiguity between marks and spaces is minimized.

While the system, as described up to this point, is reliable, it is possible to further enhance the reliability.

Consider the case where, because of input signal distortion, capacitor C2 just reaches one of the thresholds to indicate a voltage level transition and the frequency of the input signal changes. The integrating capacitor C2 has not achieved the steady state level. The failure to achieve this level prebiases the examination for the next transition (in the opposite direction) by leaving a nonstandard (i.e., different from the clamping level) initial condition. There is, therefore, a further aggravation of distortion conditions and a possible narrowing of output pulses.

In order to minimize such a possibility, there is incorporated into the apparatus means which, when the voltage level transition occurs, immediately drives the voltage of the integrating capacitor to the related voltage level. Thus, further integration or examination starts from fixed or standard levels for determining the next received bit.

In order to perform this function, two switches, in the form of transistors T11 and T12, are connected via line L6 to Schmitt trigger 34. In particular, P-N-P transistor T11 has its collector connected to line L4, its emitter connected to the source of positive potential +1 v. and its base connected, via capacitor C5, to line L6. Transistor T11 is normally cut off by virtue of biasing resistor R18 connected to source of positive potential +2 v. The time constant of capacitor C5 and resistor R18 is chosen so that they act as a differentiator and yield a narrow pulse in response to a voltage step. N-P-N transistor T12 has its collector connected to line L5, its emitter connected to source of negative potential −6 v. and its base connected, via capacitor C6, to line L6. Transistor T12 is normally cut off by virtue of biasing resistor R19 connected to source of negative potential −7 v. The time constant of capacitor C6 and resistor R19 is chosen so that they also act as a differentiator.

Whenever integrating capacitor C2 reaches the upper threshold, it will be recalled, a positive going signal reaches the base of transistor T9 of the Schmitt trigger 34. When this signal is high enough to fire the Schmitt trigger it emits a positive going transition to utilization means 36. At that time, the collector of transistor T9 emits a negative going voltage step which is fed via line L6 and capacitor C5 to the base of transistor T11 as a negative pulse. The emitter-collector circuit of transistor T11 is closed and the clamping voltage, derived from source 1 v., is fed to capacitor C2. Capacitor C2 is driven or forced to the upper clamping level. Accordingly there is no doublful prebiasing if the next bit requires an opposite transition.

Similarly, whenever integrating capacitor C2 reaches the lower threshold, a negative going signal reaches the base of transistor T9. When the signal is low enough to cause the Schmitt trigger to relax, transistor T9 cuts off. A positive going voltage step is then transmitted from the collector of transistor T9, via line L6 and capacitor C6 to the base of transistor T12, as a positive going pulse. During the presence of the pulse, transistor T12 conducts and the lower clamping voltage is fed from source of negative potential −6 v., via the emitter-collector circuit of transistor T12 and line L5, to capacitor C2. Capacitor C2 is discharged to the lower clamping level.

Referring now to FIGURE 2, there is shown a digital system for converting data bits represented by signals shifting between first and second frequencies to a voltage switching between first and second levels. For the sake of clarity the following representative parameters will be employed. However, it should be realized that the invention also contemplates other parameters. The basic bit rate is 600 bits per second. A mark bit is represented by a signal having a frequency of 1200 cycles per second; and a space bit by a signal having a frequency of 2200 cycles per second. Thus, in each bit period there are four half cycles of the 1200 cycle waveform and 7+ half cycles of the 2200 cycle waveform. Stated in another way, there are four zero-crossings of the 1200 cycle waveform or seven zero-crossings of the 2200 cycle waveform in each bit period.

It has been found that the most reliable detection of the data comes from detecting the zero crossings. Therefore, the data bits in the form of substantially sinusoidal signals shifting between the two frequencies is fed from source of data 108 to zero-crossing detector 110. The sinusoidal waveform is amplified by amplifier 110A and fed to clipping amplifier 110B to form a substantially square waveform. The square waveform is differentiated by differentiator 110C and fed via paraphase amplifier 110D to full wave rectifier 110E. The output of rectifier 110E is amplified by amplifier 110F whose output is, therefore, a series of unidirectional pulses wherein each pulse represents a zero-crossing. There is one pulse for each half cycle of the signal from source of data 108. Since each of the elements of zero-crossing detector 110 is well known, it will not be further described.

The pulses are fed to a shift register 112. The shift register 112 comprises a plurality of serially connected storage stages. A typical storage stage comprises the flip-flop FF1 and the AND gates G11 and G10.

Flip-flop FF1 is a bistable device including a set input S, a reset input R, a "1" output and a "0" output. When a positive going change in voltage is received at set input S, the flip-flop, if not already in a first stable state, is triggered to the first stable state and the "1" output goes from a high voltage level to a low voltage level and the "0" output goes from a low voltage level to a high voltage level. When a positive going change in voltage is received at reset input R, the flip-flop, if not already in a second stable state, is triggered to the second stable state and the "1" output goes from a low voltage level to a high voltage level and the "0" output goes from a high voltage level to a low voltage level. Flip-flop FF1 further includes a force-set FS input and a force-reset FR input. When a low voltage level is received at the force-set FS input the flip-flop is forced into the above-mentioned first stable state. When a low voltage level is received at the force-reset FR input, the flip-flop is forced into the above-mentioned second stable state.

Typical AND gate G11 transmits from its output a voltage having a level substantially equal to the highest voltage level then present at any one of its inputs. It should be carefully noted that if one input is at a high voltage level, then, regardless of the voltage level of the other input, the output will be at the high voltage level; and if one input is at a low voltage level and the second input receives a negative going pulse, then the output will transmit a negative going pulse whose trailing edge is a positive going voltage transient capable of triggering a flip-flop.

As shown in FIGURE 2, AND gate G11 has a first input connected to the "1" output of flip-flop FF0 and a second input connected to line SL, and an output connected to the set input S of flip-flop FF1. AND gate G10 has a first input connected to the "0" output of flip-flop FF0 and a second input connected to line SL, and an output connected to the reset input R of flip-flop FF1. The one output of flip-flop FF1 is also connected to line S1. The remaining storage stages centering around flip-flops FF2 to FFN, are similarly constructed. Line SL is connected to shift pulse source 112A which may be a free running blocking oscillator which generates negative pulses having a pulse repetition rate which is $n$ (an integer) times greater than the bit rate. Integer $n$ should be larger than the maximum number of zero-crossings in a bit period. For the cited example, $n$ can be 16. It should be noted that for the cited example there are also $n=16$ storage stages.

Flip-flop FF0, the input flip-flop, has its set input S connected to the output of amplifier 110F of zero-crossing detector 110. The reset input R of flip-flop FF0 is connected to line SL.

Shift register 112 operates as follows. Whenever amplifier 110F transmits a negative going pulse, the trailing edge transition of the pulse sets flip-flop FF0 to the first stable state and its "1" output goes to a low voltage level. The trailing edge of the first shift pulse on line SL passes through AND gate G11 to set flip-flop FF1 to the first stable state and a representation of the pulse is stored in the first storage stage. In addition, the pulse on line SL sets flip-flop FF0 to the second stable state.

The next pulse on line SL causes a positive going edge transient to pass through AND gate G21 to set flip-flop FF2 to the first state. Flip-flop FF1 will assume a state dependent on the state of flip-flop FF0. If flip-flop FF0 is in the one state then a positive going edge transient passes through AND gate G11 and flip-flop FF1 will remain in the first state. If flip-flop FF0 is in the second state then a positive going edge transient passes through AND gate G10 to trigger flip-flop FF1 to the second state. In this manner, representations of the pulses from amplifier 110F are accumulated in the storage stages and shifted from stage to stage in response to the pulses on line SL. Each succeeding stage assumes the state of the preceding stage in response to the pulses on line SL and all stages are sequentially dependent on the state of flip-flop FF0. The state of flip-flop FF0 depends on the time of receipt of pulses from amplifier 110F with respect to the pulses on line SL. If a pulse from amplifier 110F procedes a pulse on line SL flip-flop FF0 will be in the first state at least until the occurrence of a pulse on line SL. Flip-flop FF0 will then go to the second state and remain there until another pulse is transmitted by amplifier 110F.

It should be noted that because of the repetition rate of the pulses from source 112A and the number of storage stages never less than four nor more than seven of the flip-flops FF1 to FFN will be in the first state.

Lines SI to SN, each connected to the "1" output of one of the flip-flops FF1 to FFN, respectively, all feed a conventional analog voltage adder 114. Voltage adder 114 comprising resistors 114-1 to 114-N each having one terminal connected to the junction 114J and another connected to one of the lines SI to SN. A common resistor 114C is connected between junction 114J and ground. Junction 114J is connected to the input of inverting amplifier 114A. In operation, the voltage at junction 114J is a function of the number of storage stages storing representations of zero-crossings. The greater the number, the lower the voltage at junction 114J and the higher the voltage at the output of inverting amplifier 114A. The output of inverting amplifier 114A is connected to the input of Schmitt trigger 115.

Schmitt trigger 115 is a switchable means which generates a voltage switching between first and second levels. In particular, when the voltage at the input of Schmitt trigger 115 is high the voltage at its output is high, and when the voltage at its input is low the output voltage is low. Schmitt trigger 115 comprises N-P-N transistors 116 and 118. Transistor 116 has a base connected to the output of inverting amplifier 114A, a collector connected via resistor 120 to source of positive potential +20 v. and an emitter connected via resistor 122 to source of negative potential −26 v. Transistor 118 has a base connected via resistor 124 to source negative potential −26 v. an emitter connected to the emitter of transistor 116 and a collector connected to utilization means 126 and, via resistor 128, to source of positive potential +20 v. The parallel combination of resistor 130 and capacitor 132 couples the collector of transistor 116 to the base of transistor 118. An upper voltage clamping diode 134 has its anode connected to the emitters of transistors 116 and 118 and its cathode connected to source of negative potential −1.5 v. Lower voltage clamping diode 136 has its cathode connected to the emitters of transistors 116 and 118 and its anode connected to source of negative potential −4.5 v. The clamping diodes cause the circuit to have considerable hysteresis.

Assume transistor 116 is conducting. In this case, its collector voltage is low, causing transistor 118 to be cut off. The emitter of transistor 116 is at about a −4.5 voltage potential by virtue of the clamping action of diode 136. When the voltage applied to the base of transistor 116 drops below −4.5 volts, transistor 116 cuts off. Its collector voltage rises causing a rising voltage to be fed to the base of transistor 118 which starts conducting. By virtue of the regeneration resulting from the connection of both emitters to resistor 122 and the connection of the base of transistor 118 to the collector of transistor 116 there is almost an instantaneous switching on of transistor 118. The collector thereof starts transmitting a low level voltage to utilization means 126. The emitter of transistor 116 is clamped by diode 134 to a voltage of −1.5 volts. This condition persists until the voltage fed to the base of transistor 116 rises to at least −1.5 volts. At that time, transistor 116 again starts conducting. The regenerative action takes over, resulting in transistor 116 being in full conduction and transistor 118 cut off. Transistor 118 now transmits a high level voltage to utilization means 126 and the emitter of transistor 116 is clamped to a −4.5 volt level. Thus, it is seen that there is required a three volt difference in the voltage swing at the base of transistor 116 to cause the switching of the Schmitt trigger 115. Since the signals fed to the base of transistor 116 are derived from the voltage at junction 114J, and since this voltage is dependent on the rate of occurrence of zero-crossings of the input signal, it follows that there is a spread in the number of zero-crossings for switching the level of the output voltage. For the example given, when there are six zero-crossings in a bit period the output voltage level switches to high, representing a space bit, and remains there until only five zero-crossings are monitored in a bit period time interval. At that time, the output voltage switches to a low level, representing a mark bit, and remains there until there are six zero-crossings in a bit period time interval. Hence, the ambiguity between marks and spaces is minimized.

While the system, as described up to this point is reliable, it is possible to further enhance the reliability.

Consider the case where, because of the input signal distortion, the count in the shift register 112 has not reached a steady state. The failure to achieve this count would prebias the examination for the next transition (in the opposite direction) by leaving a nonstandard (i.e., different from four or seven flip-flops in the first stable state) initial condition. There would be, therefore, a further aggravation of distortion conditions and a possible narrowing of output pulses.

In order to minimize such a possibility, there may be incorporated into the apparatus means which, when a voltage level transition occurs, immediately forces the flip-flops in the shift register 112 to the related steady state count (i.e., four or seven flip-flops in the first stable state). Thus, further examination starts from fixed or standard levels for determining the next received bit.

This enhancement of reliability is implemented by the following feature of the invention:

The collector of transistor 118 is connected to the input of inverting amplifier 140 and to the input of monostable multivibrator 142. The output of inverting amplifier 140 is connected to the input of monostable multivibrator 141. The outputs of monostable multivibrators 141 and 142 are connected via OR gate 144 to noninverting amplifier 145. The output of monostable multivibrator 141 is further connected to the force-set FS input of flip-flops FF4, FF8 and FF12. The output of monostable multivibrator 142 is further connected to the force-reset FR input of flip-flops FF4, FF8 and FF12. The output of noninverting amplifier 145 is connected to the force-set FS inputs of flip-flops FF2, FF6, FF10 and FF14 and to the force-reset FR inputs of flip-flops FF1, FF3, FF5, FF7, FF9, FF11, FF13, FF15 and FF16.

Assume the voltage at the collector of transistor 118 is high corresponding to six or seven flip-flops in the shift register 112 being in the first stable state, the voltage at the collector of transistor 118 will change to the low level when five flip-flops in the shift register are in the first stable state as a result of less frequent zero-crossings from the source of data 108. The negative going edge on the input of monostable multivibrator 142 will cause a short duration negative going pulse from the output of monostable multivibrator 142. This pulse will be applied to the force-reset FR input of flip-flops FF4, FF8 and FF12 and via one input of OR gate 144 and noninverting amplifier 145 to the force-set FS input of flip-flops FF2, FF6, FF10 and FF14 and to the force-reset FR input of flip-flops FF1, FF3, FF5, FF7, FF9, FF11, FF13, FF15 and FF16. The flip-flops in the shift register 112 will be set to that combination of first and second states (four flip-flops in the first stable state) which corresponds to a steady state application of marking bits from the source of data 108.

Assume that at a later time the source of data 108 changes to spacing bits. The collector of transistor 118 will go high when the shift register 112 contains six flip-flops in the first stable state. The positive going transition from the collector of the transistor 118 will be applied to the input of inverting amplifier 140, causing a negative going transition from the output of inverting amplifier 140. The negative going transition from inverting amplifier 140 will be applied to the input of monostable multivibrator 141 and cause a short duration negative going pulse at the output of monostable multivibrator 141. The negative going pulse from monostable multivibrator 141 will be applied to the force-set FS input of flip-flops FF4, FF8 and FF12 and via the other input of OR gate 144 and noninverting amplifier 145 to the force-set FS input of flip-flops FF2, FF6, FF10 and FF14 and to the force-reset FR input of flip-flops FF1, FF3, FF5, FF7, FF9, FF11, FF13, FF15 and FF16. The flip-flops in the shift register 112 will be set to that combination of first and second stable states (seven flip-flops in the first stable state) which corresponds to a steady state application of spacing bits from the source of data 108.

In this fashion, it is insured that all examinations start from standard levels. Accordingly, there is no doubtful prebiasing if the next bit requires an opposite transition.

Further, since the various elements shown in the system are made up of standard components, and standard assemblies, reference may be had to "High speed Computing Devices," by the staff of Engineering Research Associates, Inc., McGraw-Hill Book Company, Inc., 1950; and appropriate chapters in "Computer Handbook," McGraw-Hill, 1962, edited by Harvey D. Huskey and Granino A. Korn, and for detailed circuitry, to for example "Principles of Transistor Circuits," edited by Richard F. Shea, published by John Wiley and Sons, Inc., New York, and Chapman and Hall, Limited, London, 1953 and 1957. In addition, other references are: for system organization and components: "Logic Design of Digital Computers," by M. Phister, Jr. (John Wiley and Sons, New York); "Arithmetic Operations in Digital Computers," by R. K. Richards (D. Van Nostrand Company, Inc., New York). For circuits and details: "Digital Computer Components and Circuits," by R. K. Richards, (D. Van Nostrand Company, Inc., New York).

What is claimed is:

1. Apparatus for converting an input signal shifting between first and second frequencies of oscillation to a signal switching between first and second levels of voltage comprising means for generating at least one pulse signal for each cycle of oscillation of the input signal, means for accumulating a representation of the number of pulses occurring during a given increment of time, and means for generating a voltage of the first level of voltage as long as the representation of the number of pulses accumulated during said given increment of time is less than a given number and for generating a voltage of the second level of voltage whenever the representation of a number of accumulated pulses is greater than said given number.

2. Apparatus for converting an input signal shifting between first and second frequencies of oscillation to a signal switching between first and second levels of voltage comprising means for generating at least one pulse signal for each cycle of oscillation of the input signal, means for accumulating a representation of the number of pulses occurring during a given increment of time, and means for generating a voltage of the first level of voltage as long as the representation of the number of pulses accumulated during said given increment of time is less than a first given number and for generating a voltage of the second level of voltage whenever the representation of the number of accumulated pulses is greater than a second given number.

3. Apparatus for converting an input signal shifting between first and second frequencies of oscillation to a signal switching between first and second levels of voltage comprising means for generating at least one pulse signal for each cycle of oscillation of the input signal, means for counting the number of pulses occurring during a given increment of time, and means for generating a voltage of the first level of voltage as long as the number of pulses counted during said given increment of time is less than a given number and for generating a voltage of the second level of voltage whenever the number of counted pulses is greater than said given number.

4. Apparatus for converting an input signal shifting between first and second frequencies of oscillation to a signal switching between first and second levels of voltage comprising means for generating at least one pulse signal for each cycle of oscillation of the input signal, means for counting the number of pulses occurring during a given increment of time, and means for generating a voltage of the first level of voltage as long as the number of pulses counted during said given increment of time is less than a first given number and for generating a voltage of the second level of voltage whenever the number of counted pulses is greater than a second given number.

5. For use in a digital information transfer system wherein the information is coded combinations of bits of first and second kinds, the first kind being represented by a periodically recurring signal having a first frequency for a given period of time and the second kind being represented by a periodically recurring signal having a second frequency for said given period of time, apparatus for converting the periodically recurring signal representation of the coded combinations of bits to a voltage switching between first and second levels in accordance with the occurrence of the first and second frequency periodically recurring signals comprising pulse generating means for generating at least one pulse for each cycle of said periodically recurring signal, accumulating means for accumulating a representation of the number of pulses occurring during increments of time equal to said given period of time, and means for generating a voltage of the first level of voltage as long as the representation of the number of pulses accumulated during said given increment of time is equal to a given number and for generating a voltage of the second level of voltage whenever the representation of the number of accumulated pulses is greater than said given number.

6. The apparatus of claim 5 wherein said accumulating means includes means for insuring that at any time there is accumulated the representation of a number of pulses no less than said given number.

7. The apparatus of claim 5 wherein said accumulating means includes means for insuring that at any time the representation of a number of pulses is restricted to given upper and lower limits.

8. The apparatus of claim 5 further including means for forcing the accumulating means to represent at least one of the limit number of pulses whenever there is a transition in the generated voltage levels.

9. For use in a digital information transfer system wherein the information is coded combinations of bits of first and second kinds, the first kind being represented by a periodically recurring signal having a first frequency for a given period of time and the second kind being represented by a periodically recurring signal having a second frequency for said given period of time, apparatus for converting the periodically recurring signal representation of the coded combinations of bits to a voltage switching between first and second levels in accordance with the occurrence of the first and second frequency periodically recurring signals comprising pulse generating means for generating at least one pulse for each cycle of said periodically recurring signal, accumulating means for accumulating charge and generating a voltage whose amplitude is related to the quantity of accumulated charge, means for transferring a fixed quantity of charge for each generated pulse, means for removing charge from said accumulating means at a constant uniform rate which is independent of the frequency of said periodically recurring signals, and means for generating a voltage having a first level only when the amplitude of the voltage generated by said accumulating means is at least equal to a first amplitude.

10. The apparatus of claim 9 further comprising means for insuring that the quantity of charge accumulated by said accumulating means is never greater than a first given amount and never less than a second given amount which is less than the first given amount.

11. The apparatus of claim 9 further comprising periodically actuated gated transmission means interposed between said accumulating means and said voltage generating means to ensure that there is only a periodic sampling of said accumulating means.

12. For use in a digital information transfer system wherein the information is coded combinations of bits of first and second kinds, the first kind being represented by a periodically recurring signal having a first frequency for a given period of time and the second kind being represented by a periodically recurring signal having a second frequency for said given period of time, apparatus for converting the periodically recurring signal representation of the coded combinations of bits to a voltage switching between first and second levels in accordance with the occurrence of the first and second frequency periodically recurring signals comprising pulse generating means for generating at least one pulse for each cycle of said periodically recurring signal, accumulating means for accumulating charge and generating a voltage whose amplitude is related to the quantity of accumulated charge, means for transferring a fixed quantity of charge to said accumulating means for each generated pulse, means for removing charge from said accumulating means at a constant uniform rate which is independent of the frequency of said periodically recurring signals, and switchable means for generating a voltage having the first level and the second level, said switchable means being switched to a first state for generating the first level when the amplitude of the voltage generated by the accumulating means is a first value and being switched to a second state for generating the second level when the amplitude of the voltage generated by the accumulating means is a second value.

13. The apparatus of claim 12 further comprising means for insuring that the quantity of charge accumulated by said accumulating means is never greater than a first given amount and never less than a second given amount which is less than the first given amount.

14. For use in a digital information transfer system wherein the information is coded combinations of bits of first and second kinds, the first kind being represented by a periodically recurring signal having a first frequency for a given period of time and the second kind being represented by a periodically recurring signal having a second frequency for said given period of time, apparatus for converting the periodically recurring signal representation of the coded combinations of bits to a voltage switching between first and second levels in accordance with the occurrence of the first and second frequency periodically recurring signals comprising pulse generating means for generating at least one pulse for each cycle of said periodically recurring signal, a source of shifting pulses having a repetition rate greater than said first and second frequencies, a shift register means including a plurality of serially connected storage stages, each of said storage stages including a first input for receiving the pulses from said pulse generating means and a second input for receiving the shifting pulses to transfer representations of the pulses received at said first input sequentially from stage to stage, each of said storage stages further including an output for indicating whenever one of said representations is stored therein, and means connected to the outputs of said storage stages for generating a voltage of the first level as long as a predetermined number of storage stages store representations of the pulses received at the first input of said shift register.

15. For use in a digital information transfer system wherein the information is coded combinations of bits of first and second kinds, the first kind being represented by a periodically recurring signal having a first frequency for a given period of time and the second kind being represented by a periodically recurring signal having a second frequency for said given period of time, apparatus for converting the periodically recurring signal representation of the coded combinations of bits to a voltage switching between first and second levels in accordance with the occurrence of the first and second frequency periodically recurring signals comprising pulse generating means for generating at least one pulse for each cycle of said periodically recurring signal, a source of shifting pulses having a repetition rate greater than said first and second frequencies, a shift register means including a plurality of serially connected storage stages, each of said storage stages further including a first input for receiving the pulses from said pulse generating means and a second input for receiving the shifting pulses to transfer representations of the pulses received at said first input sequentially from stage to stage, each of said storage stages including an output for indicating whenever one of said representations is stored therein, and switchable means connected to the outputs of said storage stages for generating a voltage having the first level and the second level, said switchable means being switched to a first state for generating the first level when more than a first predetermined number of said storage stages store said representations and being switched to a second state for generating the second level when less than a second predetermined number of said storage stages store said representations.

16. The apparatus of claim 15 further comprising reset means responsive to the first level generated by said switchable means for forcing said storage stages to represent a third predetermined number greater than said first predetermined number and responsive to the second level generated by said switchable means for forcing said storage stages to represent a fourth predetermined number less than said second predetermined number.

17. The apparatus of claim 14 further comprising reset means responsive to said voltage of the first level for resetting the storage stages of said shift register to represent another predetermined number greater than said predetermined number.

References Cited

UNITED STATES PATENTS

| | | |
|---|---|---|
| 2,750,500 | 6/1956 | Aiken. |
| 2,908,865 | 10/1959 | Campbell. |
| 3,038,130 | 6/1962 | Gordon _____ 328—140 XR |
| 3,111,591 | 11/1963 | Conron et al. |
| 3,202,834 | 8/1965 | Pingry et al. _____307—233 |
| 3,383,600 | 5/1968 | Calfee _____ 325—320 |

FOREIGN PATENTS 606,724    10/1960    Canada.

ARTHUR GAUSS, Primary Examiner

S. T. KRAWCZEWICZ, Assistant Examiner

U.S. Cl. X.R.

307—233, 295; 325—320; 328—15, 136, 186; 340—171